(12) United States Patent
Ghosh

(10) Patent No.: US 8,908,686 B1
(45) Date of Patent: Dec. 9, 2014

(54) DISTRIBUTED GENERATION OF HIERARCHICAL MULTICAST FORWARDING STRUCTURES

(75) Inventor: Kaushik Ghosh, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1036 days.

(21) Appl. No.: 12/963,316

(22) Filed: Dec. 8, 2010

(51) Int. Cl.
*H04L 12/28* (2006.01)

(52) U.S. Cl.
USPC ........................................... 370/390

(58) Field of Classification Search
CPC ............................ H04L 45/00; H04L 12/1854
USPC ................. 370/390, 392, 254, 256, 351–356, 370/400–402
See application file for complete search history.

(56) References Cited

U.S. PATENT DOCUMENTS

| | | | |
|---|---|---|---|
| 6,873,603 B1 | 3/2005 | Ivaturi | |
| 7,263,099 B1 * | 8/2007 | Woo et al. | 370/390 |
| 7,420,972 B1 | 9/2008 | Woo et al. | |
| 7,649,904 B1 | 1/2010 | Ghosh et al. | |
| 7,761,500 B1 | 7/2010 | Eckert et al. | |
| 2002/0176363 A1 | 11/2002 | Durinovic-Johri et al. | |
| 2003/0026268 A1 | 2/2003 | Navas | |
| 2004/0114595 A1 | 6/2004 | Doukai | |
| 2004/0174825 A1 | 9/2004 | Li et al. | |
| 2005/0226201 A1 | 10/2005 | McMillin | |
| 2006/0092940 A1 * | 5/2006 | Ansari et al. | 370/392 |
| 2006/0235995 A1 | 10/2006 | Bhatia et al. | |
| 2007/0206492 A1 | 9/2007 | Zelig et al. | |
| 2008/0044181 A1 | 2/2008 | Sindhu | |
| 2008/0137660 A1 | 6/2008 | Olakangil et al. | |
| 2008/0198865 A1 | 8/2008 | Rudnick et al. | |
| 2009/0259734 A1 | 10/2009 | Morikawa | |

OTHER PUBLICATIONS

Yang et al, RFC3746—Forwarding and Control Element Separation (ForCES) Framework, 2004.*
U.S. Appl. No. 12/266,298, by Kaushik Ghosh, filed Nov. 6, 2008.
Quinn et al., "IP Multicast Applications: Challenges and Solutions," RFC 3170, Sep. 2001, 27 pp.
Cain et al., "Internet Group Management Protocol, Version 3," RFC 3376, Oct. 2002, 50 pp.

* cited by examiner

*Primary Examiner* — Thai Nguyen
(74) *Attorney, Agent, or Firm* — Shumaker & Sieffert, P.A.

(57) ABSTRACT

In general, techniques are described in which packet replicators of a network device cooperate to generate a distributed hierarchical forwarding structure that the packet replicators then use to replicate and forward multicast packets to multiple output interfaces. For example, packet forwarding engines (PFEs) of a router each receive a new list of interfaces for a multicast packet stream. The PFEs individually construct a hierarchical forwarding structure based on the interface list. The hierarchical forwarding structure specifies interrelationships among the PFEs, which occupy nodes within the hierarchy. Each child PFE determines from the hierarchical forwarding structure the identity of a parent PFE and issues a token, constituting forwarding state for the distributed hierarchical forwarding structure, to the parent PFE. The parent PFE uses the token to identify packets of the multicast traffic to the child PFE during replication and forwarding of multicast packets proceeding according to the hierarchical forwarding structure.

30 Claims, 9 Drawing Sheets

| | 33A |
|---|---|
| so-0/0/0.0 | |
| so-0/0/1.3 | |
| ge-1/0/0.0 | |
| so-4/0/0.0 | |
FIG. 3A
| | 33B |
|---|---|
| so-0/0/0.0 | |
| so-0/0/1.3 | |
| ge-1/0/0.0 | |
| ge-3/0/0.0 | |
| so-4/0/0.0 | |
FIG. 3B
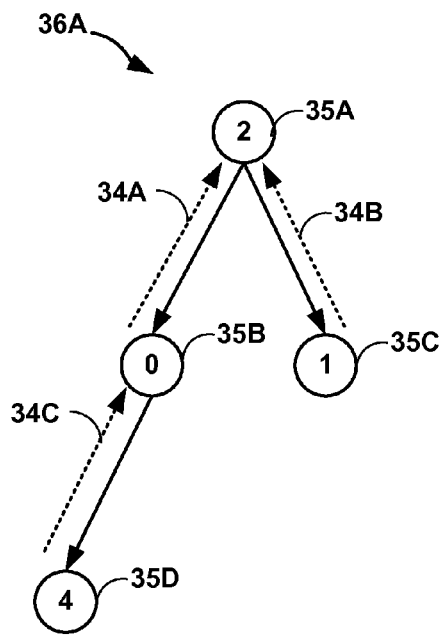
FIG. 4A
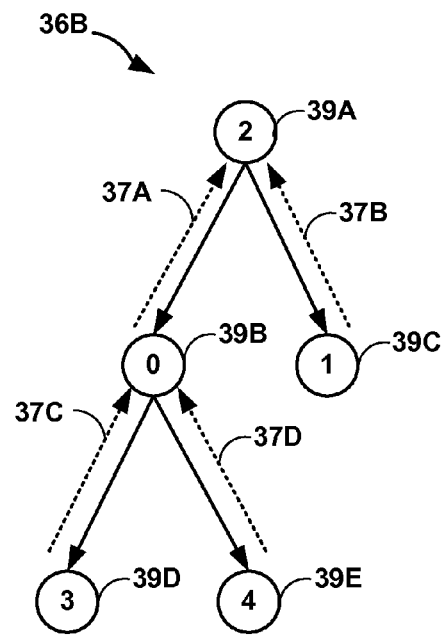
FIG. 4B

DISTRIBUTED GENERATION OF HIERARCHICAL MULTICAST FORWARDING STRUCTURES

TECHNICAL FIELD

The invention relates to computer networks and, more specifically, to replicating packet data in a computer network.

BACKGROUND

Applications that deliver substantially the same content at substantially the same time to multiple destination devices, such as Internet Protocol Television (IPTV), web-conferencing, video conferencing, and other multi-user applications, typically use multicast communication, or "multicasting," to reduce network bandwidth consumed and ease server burdens. Multicasting network packet data involves using network devices to replicate packets for receipt by multiple recipients and thereby reduce the transmission burden on the sender, leading to scalability and more efficient packet delivery to multiple recipient devices. Because the network replicates multicast packets at these network devices, multicasting may reduce the redundant transmission that may occur when transmitting data for the above multi-user applications.

Collections of interested receivers receiving the same stream of Internet Protocol (IP) packets, usually from the same multicast source, are referred to as multicast groups. Routers in an IP multicast network use a multicast routing protocol to build a multicast distribution tree to deliver multicast traffic, addressed to a group IP address, to the interested receivers. In a router that participates in implementing a multicast distribution tree for a particular multicast group, interfaces that lead toward the sources and receive multicast packets from a parent router of the tree are inbound interfaces. The router internally replicates multicast packets received at inbound interfaces and outputs the replicated multicast packets to one or more outbound interfaces leading toward the receivers.

SUMMARY

In general, techniques are described for distributed replication of multicast packets within a network device. More specifically, techniques are described in which packet replicators of a network device cooperate by using a messaging scheme to control generation and utilization of internal distributed hierarchical forwarding structures for replicating and distributing multicast packets to output interfaces of the network device.

For example, multiple packet forwarding engines (PFEs) internal to a router may operate as packet replicators. Initially, each PFE may receive a list of output interfaces for a multicast group from a routing control unit executing a multicast routing protocol. The PFEs may individually execute a deterministic algorithm to construct a replication tree that defines a hierarchical forwarding structure for that group based on the interface list. The hierarchical forwarding structure specifies hierarchical interrelationships among the PFEs, which occupy nodes within the defined hierarchy. Packets received on inbound interfaces of the router for the multicast group are replicated and forwarded to output interfaces of the router via the PFEs in accordance with the hierarchical forwarding structure for that group. As described herein, in response to a change of the output interfaces, each of the PFEs generates an updated hierarchical forwarding structure and utilizes an inter-PFE messaging scheme to control transition from the current replication tree to the updated replication tree.

As one example, upon determining the updated replication tree for a given multicast group, each child PFE determines from the hierarchical forwarding structure the identity of its parent PFE within the tree, associates a token with the hierarchical forwarding structure, and issues the token to the parent PFE to direct the parent PFE to use the token as local multicast forwarding state to identify multicast traffic to the child PFE during a distributed multicast packet replication process that proceeds according to the hierarchical forwarding structure. In this case, the token operates as a message instructing the parent PFE to transition to the new multicast tree for the group. The parent PFEs in turn include the token as a form of response or acknowledgement to indicate that the child PFEs are to utilize the updated distribution tree for those packets.

In many instances, the PFEs cooperatively generating the hierarchical forwarding structure for the new list of interfaces are simultaneously replicating packets for the multicast group in accordance with the previous hierarchical forwarding structure generated for an earlier list of interfaces. To reduce packet drops as a result of changes in the interface list for the multicast group, the PFEs cooperatively implement this messaging scheme to provide a make-before-break (MBB) technique to ensure delivery of the multicast packets presently being replicated for the group are forwarded by the PFEs in accordance with the previous hierarchical forwarding structure. Ingress PFEs associated with inbound interfaces orchestrate the deletion of the old hierarchical forwarding structure once all of the PFEs have successfully transitioned to the new hierarchical forwarding structure. For example, after generating a new hierarchical forwarding structure for the new interface list for the multicast group, issuing tokens to a parent PFE, and deleting the old hierarchical forwarding structure, the egress PFEs notify the ingress PFEs. After receiving notifications from each PFE associated with an outbound interface in the new interface list, the ingress PFEs "cut over" to use the new hierarchical forwarding structure for additional multicast packets received for the multicast group.

In one embodiment, the invention is directed to a method comprising determining, with a first one of a plurality of packet replicators of a network device, a hierarchical forwarding relationship for the first packet replicator within a distributed hierarchical forwarding structure for internally forwarding multicast packets for a multicast stream through the plurality of packet replicators from an input interface of the network device to one or more output interfaces of the network device, wherein the hierarchical forwarding relationship for the first packet replicator specifies a parent one of the packet replicators from which the first packet replicator is to receive data units of multicast packets in the multicast packet stream according to the distributed hierarchical forwarding structure. The method further comprises issuing a message within the network device from the first packet replicator to the parent packet replicator, wherein the message directs the parent packet replicator to internally forward packets in accordance with the hierarchical forwarding relationship. The method additionally comprises receiving, with the first packet replicator, a response from the parent packet replicator and forwarding a data unit of a multicast packet of the multicast packet stream in accordance with the distributed hierarchical forwarding structure.

In another embodiment, the invention is directed to a router comprising a routing unit executing within a control unit and a plurality of network interfaces. The router further comprises a plurality of packet replicators each associated with a different one or more of the plurality of network interfaces, wherein a first one of the plurality of packet replicators comprises a hierarchy generator that determines, a hierarchical forwarding relationship for the first packet replicator within a distributed hierarchical forwarding structure for internally forwarding multicast packets for a multicast stream through the plurality of packet replicators from an input interface of the network device to one or more output interfaces of the network device, wherein the hierarchical forwarding relationship for the first packet replicator specifies a parent one of the packet replicators from which the first packet replicator is to receive data units of multicast packets in the multicast packet stream according to the distributed hierarchical forwarding structure. The router also comprises a setup module which issues a message within the network device from the first packet replicator to the parent packet replicator, wherein the message directs the parent packet replicator to internally forward packets in accordance with the hierarchical forwarding relationship. The router further comprises a distributor that, upon the setup module receiving a response from the parent packet replicator, forwards a data unit of a multicast packet of the multicast packet stream in accordance with the distributed hierarchical forwarding structure.

In another embodiment, the invention is directed to a non-transitory computer-readable medium containing instructions. The instructions cause a programmable processor to determine, with a first one of a plurality of packet replicators of a network device, a hierarchical forwarding relationship for the first packet replicator within a distributed hierarchical forwarding structure for internally forwarding multicast packets for a multicast stream through the plurality of packet replicators from an input interface of the network device to one or more output interfaces of the network device, wherein the hierarchical forwarding relationship for the first packet replicator specifies a parent one of the packet replicators from which the first packet replicator is to receive data units of multicast packets in the multicast packet stream according to the distributed hierarchical forwarding structure. The instructions further cause the programmable processor to issue a message within the network device from the first packet replicator to the parent packet replicator, wherein the message directs the parent packet replicator to internally forward packets in accordance with the hierarchical forwarding relationship. The instructions additionally cause the programmable processor to receive, with the first packet replicator, a response from the parent packet replicator and forwarding a data unit of a multicast packet of the multicast packet stream in accordance with the distributed hierarchical forwarding structure.

The techniques of this disclosure may provide one or more advantages. For example, because the packet replicators of the router cooperatively generate the hierarchical forwarding structure in a distributed manner to determine local multicast forwarding state within the replicators, the techniques may reduce utilization of a routing control unit of the router and may increase a rate at which the local multicast forwarding state is updated to account for new interface lists by reducing coordination activities with the routing control unit. Replicating packets using multiple PFEs in accordance with the hierarchical forwarding structure distributes the replication burden and results in a more even utilization of the PFEs. Moreover, while conventional methods for implementing make-before-break techniques involve switching, using an indirect next hop, among multiple next hops that each refer to a different hierarchical forwarding structure, the techniques of this disclosure may obviate the need for an indirect next hop by enabling packet replicators to disambiguate local multicast forwarding state using tokens, rather than a next hop identifier received from the routing control unit. Reducing the number of next hops and eliminating indirect next hops may reduce memory utilization within the routing control unit and/or within the packet replicators, as well as reducing or in some cases eliminating out-of-order delivery due to switching to a modified replication structure.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIGS. 3A-3B illustrate tables that represent exemplary output interface lists of a multicast route entry for a multicast group.

FIG. 4 illustrates exemplary hierarchical forwarding structures generated by each of the packet replicators of the exemplary router of FIG. 2, according to one example of a deterministic hierarchical forwarding structure generation algorithm

DETAILED DESCRIPTION

Figure 1:
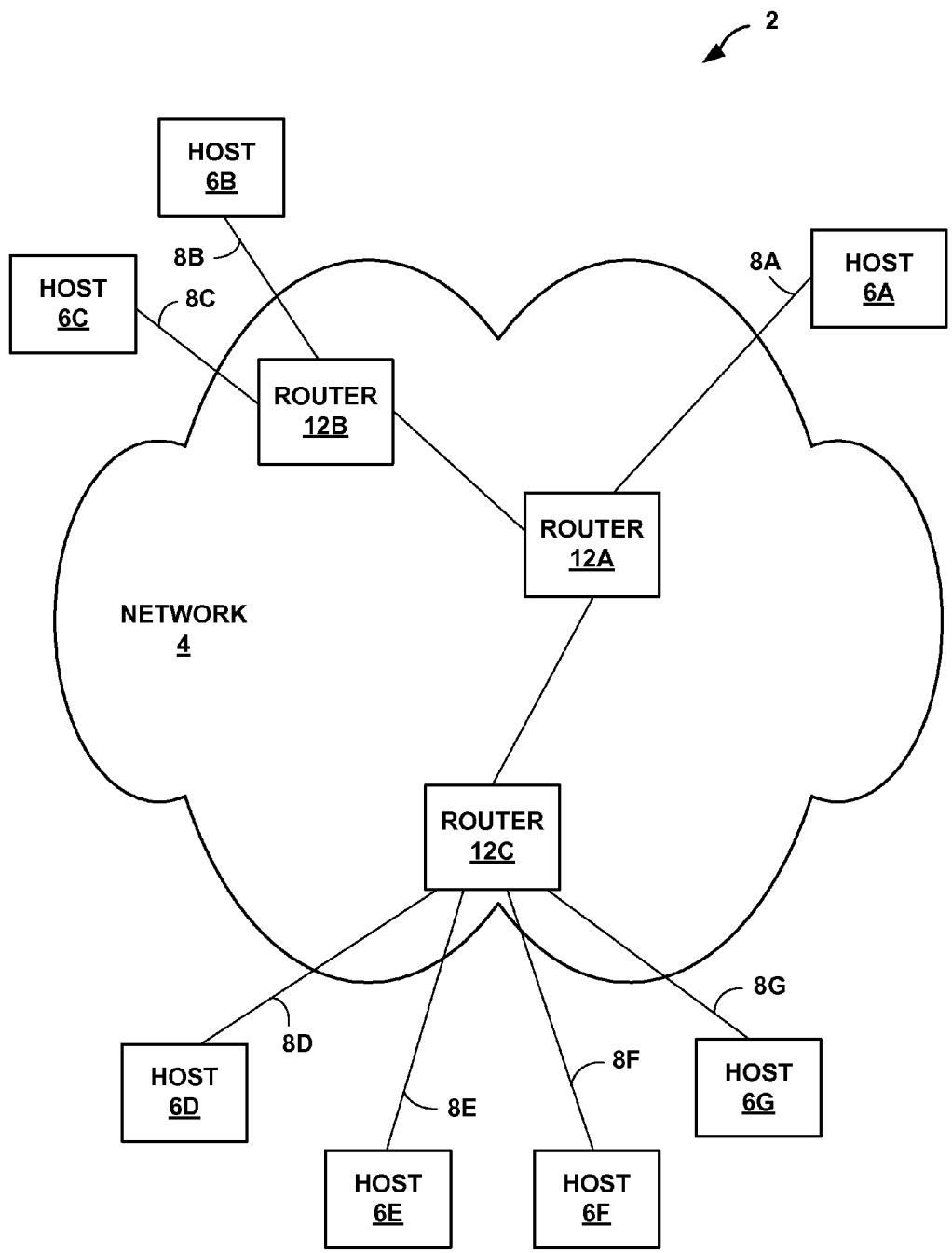
FIG. 1 is a block diagram illustrating a computer network that supports a distributed multicasting packet replication setup and distribution scheme consistent with the principles of the invention.

FIG. 1 is a block diagram illustrating a computer network 2 that supports a distributed multicasting packet replication setup and distribution scheme consistent with the principles of the invention. Computer network 2 includes a network 4 that may be accessed by hosts 6A-6G (collectively, "hosts 6") via one of communication links 8A-8G (collectively, "communication links 8"). Each of hosts 6 represents an entity, such as an individual or an organization, that accesses network 4 to communicate with other hosts connected to network 4. Each of hosts 6 may comprise an endpoint device, such as a personal computer, a laptop computer, a mobile telephone, a network telephone, a television set-top box, a network device integrated into a vehicle, a video game system, a point-of-sale device, a personal digital assistant, an intermediate network device, a network appliance, a supercomputer, a mainframe computer, or another type of device capable of interfacing with and communicating over network 4. The term "communication link," as used herein, includes any form of transport medium, wired or wireless, and can include intermediate nodes such as network devices. For example, communication links 8 may comprise Gigabit Ethernet (GigE) or other Ethernet connections, ATM, Synchronous Optical Networking (SONET), or other network connections.

Network 4 includes routers 12A-12C (collectively, "routers 12"). Routers 12 support one-to-many communications, such as multicasting, any casting, or broadcasting, using a protocol that allows one of hosts 6 (referred to as a source host) to send a single packet, and multiple other hosts 6 (referred to as destination hosts) to receive the packet. A source host may use multicasting to distribute streaming data such as video, audio, data, or other information. Example multicast applications include video games, Voice over Internet Protocol (VoIP), Internet Protocol Television (IPTV), video-telephony, video-conferencing, internet teleconferences, online web-based meetings, archived video playback, multicast messaging (e.g., "Twitter"), software update rollouts, and other applications that typically presents content concurrently, simultaneously, or "live" to a plurality of devices. As a result, multicast communications were developed and most networks, including network 4, support multicast communications. Although described with respect to multicast communications, the techniques are applicable to other forms of one-to-many communications.

Network 4 may transmit content to hosts 6 via one or more packet-based protocols, such as Transmission Control Protocol/Internet Protocol (TCP/IP) or User Datagram Protocol/Internet Protocol (UDP/IP). In this respect, network 4 may support the transmission of data via discrete data units, often referred to as "packets." As a result, network 4 may be referred to as a "packet-based" or "packet switched" network. While described in this disclosure as transmitting, conveying, or otherwise supporting packets, network 4 may transmit data according to any other discrete data unit defined by any other protocol, such as a cell defined by the Asynchronous Transfer Mode (ATM) protocol. Internet Protocol may include IPv4 or IPv6, for example.

In addition, network 4 may comprise a public network, such as the Internet, a private network, such as those owned and operated by an enterprise, or a combination of both public and private networks. Network 4 may further comprise one or more Wide Area Networks (WANs), Local Area Networks (LANs), Virtual Local Area Networks (VLANs), Virtual Private Networks (VPNs), and/or any another type of network. In some instances for example, network 4 comprises a large public WAN, such as the Internet, over which a number of private networks owned by the same enterprise communicate to form a VPN. Thus, although shown as a single network 4 in FIG. 1, network 4 may comprise any number of interconnected networks, either public or private, in which the various networks interconnect to form various virtual networks.

The devices of computer network 2 may support a protocol, such as the Internet Group Management Protocol (IGMP), that facilitates multicasting. Routers 12 execute IGMP to establish and manage network multicast group memberships. Hosts 6 execute IGMP to request membership in various multicast groups as multicast sources and receivers. That is, multicasting groups may include one or more source hosts 6 and one or more receiver (destination) hosts 6. Additional information about multicasting techniques in general may be found in Quinn & Almeroth, RFC 3170, "IP Multicast Applications: Challenges and Solutions," Network Working Group, the Internet Engineering Task Force draft, September 2001, available at http://tools.ietf.org/html/rfc3170, which is incorporated herein by reference in its entirety. IGMP is described in Cain et al., RFC 3376, "Internet Group Management Protocol, Version 3," Network Working Group, the Internet Engineering Task Force proposed standard, October 2002, available at http://tools.ietf.org/html/rfc3376, which is incorporated herein by reference in its entirety.

To register for a multicast group, each destination host 6 sends an IGMP control packet, e.g., a Host Membership Report, to a local one of routers 12 indicating interest in joining a particular multicast group. The multicast group is typically identified by a multicast address that forms the destination address in the source/destination address pair of the multicast packet. For example, with reference to the example of FIG. 1, a multicast group may be established to include a set of destination hosts, 6B, 6C, 6D, and 6F. In general, source host 6A may send a single multicast packet, for each packet in the multicast stream for the multicast group, across network 4.

One or more routers 12 within network 4 execute a multicast routing protocol to cooperatively determine a multicast distribution tree for a multicast group that controls the multicast forwarding path that multicast packets traverse through the network. Upon determining the multicast distribution tree, routers 12 establish and employ local multicast forwarding state of routers 12 to efficiently replicate and forward individual multicast packets sent by source host 6A to the multicast group in accordance with the multicast distribution tree. In this way, destination hosts 6B, 6C, 6D, and 6F receive packets identical to the packets sent by host 6A. Continuing the above example, source host 6A may send a multicast packet to router 12A for the multicast group that includes destination hosts 6B, 6C, 6D, and 6F. Router 12A may identify the packet as a multicast packet and determine, from local multicast forwarding state corresponding to the multicast distribution tree for the multicast group, individual routers 12 to which the packet should be forwarded. In this case, both router 12B and 12C must receive a copy of the multicast packet. Router 12A replicates the packet and forwards to each router 12B and router 12C a packet identical to the multicast packet sent by source host 6A. Router 12C receives the packet sent by router 12A, and identifies the packet as a multicast packet. Router 12C determines, from the multicast distribution tree, which of hosts 6D to 6G are registered as destination hosts to receive the packet. Router 12C replicates the packet and sends a copy to host 6D and 6F, assuming that hosts 6D and 6F are the only two hosts included in the multicast group for purposes of this example. Router 12B distributes the packets to destination hosts 6B and 6C in the same way that router 12C distributes the packets to destination hosts 6D and 6F.

Routers 12 replicate multicast packets in order to distribute identical copies of the packets to other multicasting-enabled routers 12, or to destination hosts of a multicasting group. As described in detail herein, routers 12 replicate multicast packets using packet replicators associated with a set of interfaces of one or more interface cards (IFCs). Packet replicators may include packet forwarding engines (PFEs) associated with IFCs of routers 12, controllers, micro-processors, or other programmable logic modules, such as programmable interface controllers or field-programmable gate arrays (FPGAs), as well as application-specific integrated circuits (ASICs).

For example, one of routers 12 may include a first packet replicator associated with one or more interfaces, e.g., interfaces 1-4, and a second packet replicator associated with one or more interfaces, e.g., interfaces 5-8. In this manner, interfaces 1-4 may be considered local to the first packet replicator and interfaces 5-8 may be considered local to the second packet replicator. The number of interfaces associated with each packet replicator may vary. Each of routers 12 executes the multicast routing protocol to determine inbound and outbound interfaces of the router to facilitate multicast distribution trees for various multicast groups maintained by network 4. That is, each of routers 12 determine one or more expected local inbound interfaces for multicast packets for a multicast groups as well as one or more local outbound interfaces that the router is to use to forward replicated multicast packet to downstream devices, including other routers and/or destination hosts 6.

An inbound multicast packet received by one of routers 12 has a source/destination address pair that identifies a multicast distribution tree and, consequently, a multicast group and a particular interface list generated by the receiving router for the multicast group. The interface list may contain a list of inbound and outbound interfaces of the receiving router 12 for the multicast group.

Packet replicators of the receiving router 12 replicate multicast packets on a distributed basis in accordance with the principles of the invention. For a given multicast group and associated interface list, the packet replicators each independently determine a hierarchical forwarding relationship among the packet replicators. Based on the hierarchical forwarding relationship, the packet replicators then generate and exchange multicast forwarding state to enable the packet replicators to cooperatively replicate and forward multicast packets in a distributed manner according to the hierarchical forwarding relationship.

As a result, the packet replicators perform both multicast packet replication/forwarding setup and execution tasks in a distributed, i.e., de-centralized, manner that may reduce utilization of a routing control unit of the receiving router 12 and may increase a rate at which the local multicast forwarding state is updated to account for new interface lists by reducing coordination activities with the routing control unit.

Figure 2:
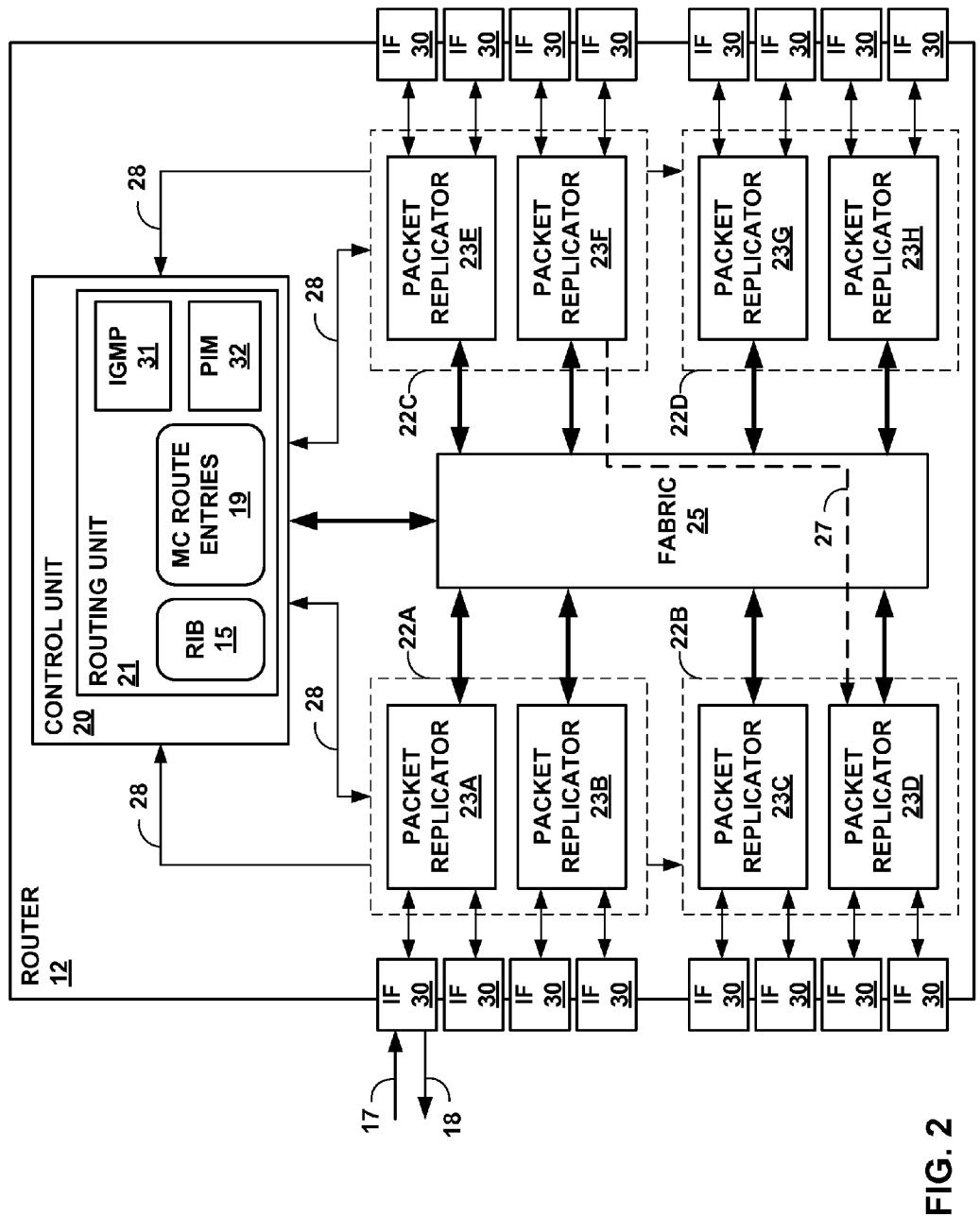
FIG. 2 is a block diagram illustrating an exemplary router that implements distributed multicasting packet replication setup and distribution techniques in accordance with the techniques described herein.

FIG. 2 is a block diagram illustrating an exemplary router 12 that implements distributed multicasting packet replication setup and distribution techniques in accordance with the techniques described herein. Router 12 may represent an embodiment of one of routers 12 of FIG. 1. Router 12 includes a control unit 20 that provides an operating environment for routing unit 21. Control unit 20 may include one or more processors or controllers (not shown in FIG. 2) that execute software instructions, such as those used to define a software or computer program, stored to a tangible computer-readable medium (again, not shown in FIG. 2), such as a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, or in addition, control unit 20 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware.

Routing unit 21 executes routing protocols to maintain routing information base 15 ("RIB 15") to reflect the current topology of a network and other network entities to which router 12 is connected. In addition, routing unit 21 executes IGMP 31 to establish and manage network multicast group memberships. Protocol Independent Multicast 32 ("PIM 32") executes within routing unit 21 to use routing information in RIB 15 to generate respective multicast route entries 19 ("MC Route Entries 19") for multicast groups managed by IGMP 32. PIM 32 is a multicast routing protocol and may execute one or more of PIM Dense Mode, PIM Sparse Mode, Bidirectional PIM, or PIM source-specific multicast techniques to generate multicast route entries 19. Multicast route entries 19 stores one or more entries for associated multicast groups. Each entry includes state information that router 12 components use to identify inbound and outbound interfaces that correspond to edges of a multicast distribution tree that a network uses to distribute multicast streams for the associated multicast group. For example, a route entry in multicast route entries 19 includes a source address and group address that correspond to source/destination address of multicast packets and that router 12 components use to classify the multicast packets to the multicast group of the route entry. The route entry additionally includes reverse-path forwarding (RPF) information that specifies a list of inbound interfaces (IIFs) of router 12 from which multicast packets having the source address and group address are accepted for forwarding, as well as a list of outbound interfaces (OIFs) of router 12 to which the multicast packet are to be forwarded. For example, inbound interfaces may be specified as PIM RPF-check interfaces on ingress ones of packet replicators 23. In some embodiments, multicast route entries 19 may comprise a multicast routing table and a multicasting table. A multicast routing table may specify a next hop identifier for a source/destination address (S,G) or (*,G) pair for a multicast distribution tree for a multicast group, while the multicast table specifies OIFs and IIFs for each next hop identifier.

Router 12 further comprises interface controllers 22A-22D each coupled to a different plurality of interfaces 30 to receive inbound traffic 17 and forward the traffic locally or through fabric 25 toward an appropriate interface 30 for output as outbound traffic 18. For simplicity, inbound traffic 17 and outbound traffic 18 are illustrated with respect to only one of interfaces 30. Interfaces controllers 22 may couple to interfaces 30 by insertion of physical interface cards (PICs) that each includes one or more interfaces 30 into slots defined by interface controllers 22. Interface controllers 22 may include, for example, dense port concentrators (DPCs), flexible PIC concentrators (FPCs), and modular port concentrators (MPCs) with associated modular interface cards (MICs).

In the illustrated embodiment, each of interface controllers 22 includes a respective pair of packet replicators 23A-23H each associated with a different set of interfaces 30. For example, interface controller 22A includes packet replicators 23A and 23B. Of the four interfaces 30 coupled to interface controller 22A, two are associated with packet replicator 23A and two are associated with packet replicator 23B. In various embodiments, router 12 may include varying numbers of interface controllers 22 and each of interface controllers 22 may include different numbers of packet replicators 23. For example, in one embodiment router 12 may include one interface controller 22 with a single packet replicator 23. In another embodiment, router 12 may include a first interface controller 22 having one packet replicator 23 and a second interface controller 22 having four packet replicators 23. Packet replicators 23 may include one or more processors or controllers (not shown in FIG. 2) that execute software instructions, such as those used to define a software or computer program, stored to a tangible computer-readable medium (again, not shown in FIG. 2), such as a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, or in addition, packet replicators 23 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware.

Control unit 20 is connected to each of interface controllers 22 by dedicated internal communication links 28. For example, dedicated links 28 may comprise 200 Mbps Ethernet connections. Routing unit 21 sends copies of multicast route entries 19 to packet replicators 23 to direct multicast packet replication and forwarding in accordance with multicast distribution trees generated by PIM 32 for multicast groups maintained by IGMP 31.

Fabric 25 interconnects packet replicators 23 and may comprise, for example, a crossbar or switching fabric. Packet replicators 23 receive multicast packets of inbound traffic 17 in respective associated interfaces 30 and replicate and forward the multicast packets across fabric 25 to other packet replicators 23 for output via interfaces 30 to implement multicast distribution trees represented in router 12 by multicast route entries 19. Packet replicators 23 may divide packets into one or more data units (e.g., "chunks" or "cells") for transmission via fabric 25 and reassemble received data units into outbound packets. While the techniques are generally described herein with respect to internally replicating and forwarding "packets," packet replicators 23 operating in accordance with the techniques may be replicating and forwarding one or more data units that collectively constitute the respective packets. U.S. Patent Application 2008/0044181, entitled MULTI-CHASSIS ROUTER WITH MULTIPLEXED OPTICAL INTERCONNECTS, describes a multi-chassis router in which a multi-stage switch fabric, such as a 3-stage Clos switch fabric, is used as a high-end forwarding plane to relay packets between multiple routing nodes of the multi-chassis router. The entire contents of U.S. Patent Application 2008/0044181 are incorporated herein by reference.

In accordance with the distributed multicasting packet replication setup and distribution techniques described herein, packet replicators 23 independently determine and cooperatively exchange forwarding state to create a distributed hierarchical forwarding structure. For example, each of packet replicators 23 may generate a hierarchical forwarding data structure, such as a binary tree data structure, by passing a list of interfaces 30 (hereinafter, an "interface list") of a multicast route entry for a multicast group to a deterministic hierarchical forwarding structure generation algorithm. The algorithm generates a hierarchical forwarding structure to include nodes that represent each of packet replicators 23 that is associated with one of interfaces 30 in the interface list. The hierarchical forwarding structure defines hierarchical forwarding relationships among represented packet replicators 23. Each packet replicator 23 represented replicates and forwards multicast packets in accordance with the hierarchical forwarding relationship defined by the hierarchical forwarding structure.

In one instance of this example, in a particular hierarchical forwarding structure for a multicast group, packet replicator 23A may occupy a first tier of the structure, while packet replicators 23D and 23G occupy a second tier of the structure in a child relationship to packet replicator 23A. In this example, when packet replicator 23A receives a multicast packet for the multicast group, packet replicators 23A creates copies of the multicast packet and forwards the multicast packet to child packet replicators 23D and 23G for output on their associated interfaces and/or further replication by the second tier replicators to additional packet replicators 23 that occupy a third tier of the hierarchical forwarding structure. In this example, each of represented packet replicators 23 may determine its "sending" packet replicator 23 by identifying a corresponding parent node using the hierarchical forwarding relationships defined by the hierarchical forwarding structure.

In another example, packet replicators 23 replicate and forward multicast packets for a multicast group by selecting downstream packet replicators 23 in an interface list for the group according to a deterministic replication and forwarding algorithm. In this example, packet replicators 23 may propagate multicast forwarding state information via fabric 25 in conjunction with at least a portion of a particular multicast packet being replicated and forwarded To determine hierarchical forwarding relationships, each packet replicator 23 applies a deterministic hierarchical relationship algorithm to a representation of an interface list for a multicast group to identify a sending packet replicator, i.e., another packet replicator 23 from which the packet replicator 23 will receive multicast packets for the multicast group in accordance with the replication and forwarding algorithm.

Upon individually determining hierarchical forwarding relationships, packet replicators 23 exchange forwarding state information in a distributed manner to implement the hierarchical forwarding relationships among packet replicators 23 for distributed replication and forwarding at the receiving router 12. Specifically, using the determined hierarchical forwarding relationship, each of the packet replicators 23 issues a token to its respective sending packet replicator 23. In addition, each sending packet replicator 23 associates tokens received from receiving packet replicators 23 with the receiving replicators 23 in a multicast forwarding structure local to the parent packet replicator. Receiving packet replicators 23 further populate their respective local forwarding data structures with local elaboration interfaces, that is, those interfaces 30 that are listed in the interface list and are associated with the respective receiving packet replicator. As a result, in combination, the distributed, local forwarding data structures for a multicast group as stored by each of the represented packet replicators 23 result in an aggregate multicast replication and forwarding structure for router 12.

In the illustrated example, packet replicator 23F determines a hierarchical forwarding relationship based on an interface list (e.g., an OIF) for a particular multicast group. In particular, packet replicator 23F determines packet replicator 23D is its sending packet replicator for the multicast group. Packet replicator 23F therefore allocates and issues a token in fabric message 27 to packet replicator 23D, which thereafter uses the token to identify a specific replication list to be used to process multicast packets for the multicast group to packet replicator 23F.

An ingress packet replicator 23 associates tokens received from receiving packet replicators 23 with the source/destination address pair for the relevant multicast group in a local forwarding data structure of the ingress packet replicator 23.

For example, an ingress packet replicator 23 may use a token identifier as a next hop identifier for a multicast route for the source/destination address pair. Packet replicators 23 may identify themselves as an ingress packet replicator for a multicast group using an interface list received by packet replicators 23 from routing unit 21. An ingress one of packet replicator 23 may also be an egress one of packet replicators 23. This may occur, for example, when one of packet replicators 23 is associated with both the ingress interface 30 and at least one of the egress interfaces 30 for a particular multicast group.

When an ingress packet replicator 23 receives a multicast packet, the ingress packet replicator 23 identify tokens and receiving packet replicators 23 from the local forwarding data structure using the source/destination address pair in the packet header. The ingress packet replicator 23 then replicates and forwards, in conjunction with the respective tokens, a copy of the multicast packet to each of the receiving packet replicators 23. Each of the receiving packet replicators 23 receives the multicast packet, uses the associated token to identify a local forwarding data structure, and replicates and forwards the multicast packet in accordance with the identified local forwarding data structure, which may include both inter-packet replicator 23 replication as well as local elaboration to associated interfaces 30.

Performing the techniques in this manner may remove involvement of routing unit 21 in generating multicast forwarding state for packet replicators 23. This may reduce a number of next hop structures within multicast route entries 19 where, conventionally, updates to interface lists otherwise require the system to maintain additional state, in the form of indirect next hops, to allow packet replicators to implement make-before-break (MBB) techniques to ensure in-order delivery of packets presently being replicated and forwarded by packet replicators in accordance with an outdated multicast next hop structure. The techniques of this disclosure may allow routing unit 21 to maintain a single multicast next hop structure for a multicast group by updating interface lists as needed and outputting the updated lists to packet replicators 23 to cooperatively generate multicast forwarding structures for the updated interface lists that represent a modified multicast group. The techniques may also eliminate out-of-order delivery of in-flight packets when the multicast distribution changes and result in faster MBB switchover due to the absence of a central coordinator, i.e., routing unit 21. Although described with respect to a router, the techniques of this disclosure are applicable to other network devices that output a packet via a plurality of interfaces, such as network switches.

FIG. 3A illustrates a table that represents an exemplary output interface list 33A ("OIF 35A") of a multicast route entry for a multicast group. OIF 33A is a list of interface name strings that identify output interfaces of router 12 of FIG. 2. In the exemplary format, the interface name is represented by a physical part and a logical part in the following format: physical.local. The physical part of the interface name identifies the physical device corresponding to a single physical network interface connector, or port. The physical part has the following format: type-replicator/pic/port, where type identifies the interface type such as SONET ("so") or GigE ("ge"), replicator identifies to an index or other identifier of a packet replicator 23 of router 12, pic refers to a physical interface card, and port indexes a particular interface connection on the referenced physical interface card. OIF 33A includes interface names for interfaces associated with packet replicators with indices 0, 1, and 4, which correspond to packet replicators 23A, 23B, and 23E, respectively.

FIG. 3B illustrates a table that represents an exemplary output interface list 33B ("OIF 33B") that illustrates OIF 33A modified to include interface so-3/0/0.0, which is an interface associated with packet replicator 23D having index 3 in router 12.

FIG. 4A illustrates multicast replication tree 36A, an exemplary hierarchical multicast replication data structure generated by each of packet replicators 23, according to one example of a deterministic hierarchical forwarding structure generation algorithm. Each of packet replicators 23 generates multicast replication tree 36A upon receiving interface lists, including OIF 33A of FIG. 3A, for a multicast group. Multicast replication tree 36A includes nodes 35A, 35B, 35C, and 35D representing respective packet replicators 23C, 23A, 23B, and 23E. Packet replicator 23C is an ingress packet replicator associated with an inbound interface 30 for the multicast group. In some instances, packet replicator 23C may be both an ingress and egress packet replicator. In some instances, only the subset of packet replicators 23 represented in OIF 33A generates multicast replication tree 36A to perform the distributed multicast forwarding structure generation techniques herein described.

After generating multicast replication tree 36A, each of packet replicators 23 determines hierarchical forwarding relationships with other packet replicators. In particular, each of packet replicators 23 determines its sending packet replicator according to representative nodes 35 in multicast replication tree 36A. In this example, node 35A occupies a higher tier and is a parent node for nodes 35B and 35C. Ingress packet replicator 23C is thus a sending packet replicator for packet replicators 23A and 23B corresponding to nodes 35B and 35C, respectively. Similarly, packet replicator 23A is a sending packet replicator for packet replicator 23E. In some instances, ingress packet replicator 23C may also be an egress packet replicator and therefore represented twice in multicast replication tree 36A as both a root and a leaf node.

Each of receiving packet replicators 23 allocate and issue a respective one of tokens 34A-34C to its sending receiver as determined from the hierarchical forwarding relationship. For instance, packet replicator 23A represented by node 35B issues token 34A to ingress packet replicator 23C represented by node 35A. Each token is a string, integer, bit string, or other value that is unique within a scope of a particular packet replicator 23 and thus enables the packet replicator to use the token as a lookup value to disambiguate, i.e., select, local forwarding data structures. Tokens may be alternatively referred to as "fabric tokens."

Performing the techniques in this manner may remove routing unit 21 from the control plane for determining and implementing hierarchical forwarding relationships for a multicast group. That is, packet replicators 23 cooperatively determine hierarchical forwarding relationships and distribute localized tokens, unknown to routing unit 21, to enable receiving packet replicators to select the appropriate local forwarding data structure for a multicast packet associated with a multicast group. This may improve the scalability of routing unit 21.

To implement the hierarchical forwarding relationships for a multicast group, sending packet replicators 23 forward multicast packets for the multicast group across fabric 25 together with an appropriate token to enable the receiving packet replicators to select the appropriate local forwarding data structure for the multicast packet. For instance, to implement a hierarchical forwarding relationship defined by multicast replication tree 36A, ingress packet replicator 23C forwards multicast packets for the represented multicast group together with token 34A to packet replicator 23A.

FIG. 4B illustrates multicast replication tree 36B, an exemplary hierarchical forwarding structure generated by each of packet replicators 23, according to one example of a deterministic hierarchical forwarding structure generation algorithm, after packet replicators 23 receive OIF 33B after an update to OIF 33A by a routing unit. Represented packet replicators 23 maintain local forwarding state for multicast replication tree 36A for multicast packets for the group "in transit," that is, being replicated and forwarded by packet replicators 23 while the packet replicators cooperatively generate additional local forwarding data structures according to the described techniques to implement multicast replication tree 36B.

In some instances, for example, where PIM 32 executes Bidirectional PIM, multicast distributions trees for multicast groups may result in multiple acceptable inbound interfaces and, thus, multiple possible ingress packet replicators 23 for the multicast traffic. In such instances, ingress node 35A may represent each of the ingress packet replicators 23, and packet replicators 23A, 23B corresponding to nodes 35B, 35C issue respective tokens 34A, 34B to each of the ingress packet replicators 23.

In some embodiments, each of packet replicators 23 generates two multicast replication trees according to a deterministic hierarchical forwarding structure that ensures that, for a given interface list, an ingress packet replicator 23 is a leaf node for one of the two multicast replication trees. In such instances, packet replicators 23 select the tree having the ingress packet replicator 23 as a leaf node to perform the distributed setup techniques described above. In instances where multiple acceptable ingress ingresses associated with multiple ingress packet replicators 23 exist, packet replicators 23 may perform the above-described techniques with respect to both trees and thus generate local forwarding state for both trees. Additional information regarding generating multiple multicast replication trees may be found in U.S. application Ser. No. 12/266,298, entitled "PLATFORM-INDEPENDENT CONTROL PLANE AND LOWER-LEVEL DERIVATION OF FORWARDING STRUCTURES," the entire contents of which are incorporated by reference herein.

Figure 5:
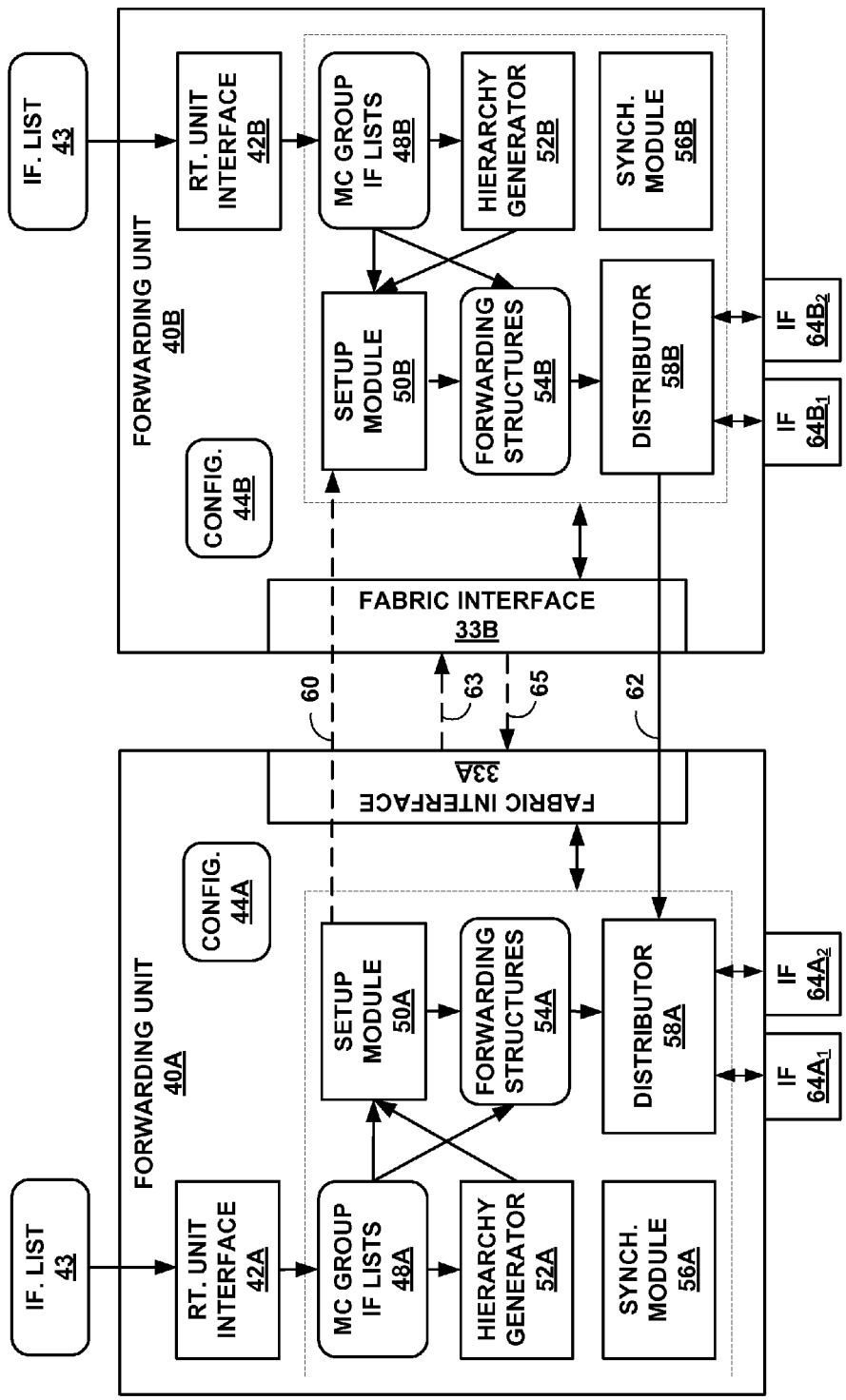
FIG. 5 is a block diagram illustrating exemplary forwarding units that cooperatively establish local forwarding data structures and replicate and forward multicast traffic in accordance with the distributed setup techniques herein described.

FIG. 5 is a block diagram illustrating exemplary forwarding units 40A-40B ("forwarding units 40"), associated with respective interface ("IF") sets $64A_1$-$64A_2$ and $64B_1$-$64B_2$, that cooperatively establish local forwarding data structures and replicate and forward multicast traffic in accordance with the distributed setup techniques herein described. Forwarding units 40 may represent exemplary embodiments of packet replicators 23 of FIG. 2. For example, forwarding units 40 may comprise packet forwarding engines of one or more interface concentrators, such as DPCs or FPCs. Configuration data 44A-44B ("config. 44A-44B") determines an index or other identifier for a respective forwarding unit 40 to enable the forwarding units to distinguish and identify themselves as occupying a particular slot or address within a router and/or as associated with a particular set of interfaces. Configuration data 44 may, for example, be programmed by an administrator or be determined by an interface slot of a chassis.

Forwarding units 40 may implement identical functionality. For example, forwarding unit 40A includes fabric interface 33A that manages ingress and egress buffers that provide congestion avoidance and traffic prioritization. Fabric interface 33A queues packets based on destination and may manage multicast traffic independent of unicast traffic. For example, fabric interface 33A may provide separate queues for multicast traffic to reduce latency during hierarchical multicast packet replication.

Routing unit interface 42A of forwarding unit 40A communicates with a routing unit that implements a control plane for a router that includes forwarding units 40. Routing unit interface 42A receives interfaces lists, including OIFs, for various multicast groups managed by the router with IGMP. In the illustrated instance, routing unit interface 42A and routing unit interface 42B of forwarding unit 40B receive interface list 43 ("IF. list 43") from a routing unit for the router. Routing unit interface 42A stores interface list 43 to multicast group interface lists 48A, a data structure that at least temporarily stores interface lists for establishing local forwarding data structures for multicast groups. Interface list 43 may comprise a next hop structure, which may include, for example, a composite next hop that includes one or more outgoing next hop addresses or a multiroute next hop that comprises one or more outbound logical interfaces, as well as route information such as (S,G) or (*,G) values. Multicast group interface lists 48A may receive and store interface list 43 as a next hop structure. Interface list 43 may comprise a new interface list for a new multicast group or modified interface lists for a modified multicast group.

Upon receiving interface list 43, hierarchy generator 52A determines hierarchical forwarding relationships between forwarding unit 40A and other forwarding units 40. In some embodiments, hierarchy generator 52A may input interface list 43 to a deterministic hierarchical forwarding structure generation algorithm to construct a hierarchical forwarding structure, such as a multicast replication tree to identify the sending forwarding unit. In some embodiments, hierarchy generator 52A may input interface list 43 to a deterministic algorithm that, given an index or other identifier for forwarding unit 40A, determines the sending forwarding unit 40 for forwarding unit 40A, if any, as well as child forwarding units 40 for forwarding unit 40A, if any. In the illustrated example, hierarchy generator 52A identifies forwarding unit 40B as the sending forwarding unit for interface list 43.

Figures 6A, 6B:
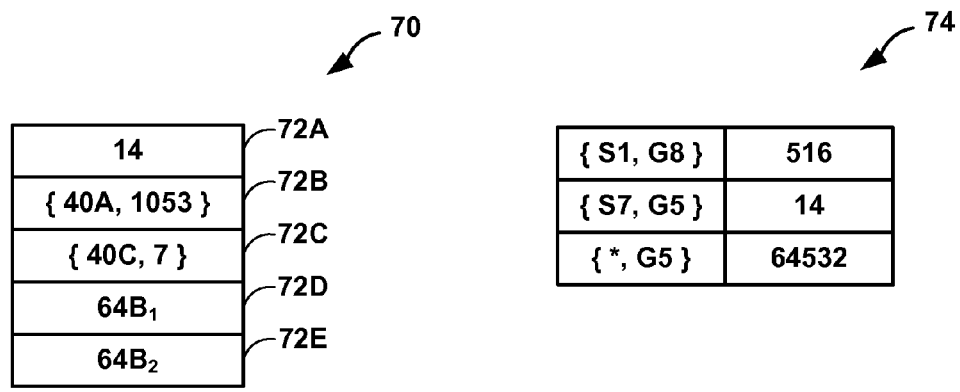
FIG. 6A illustrates a local forwarding data structure generated according to the distributed hierarchical forwarding structure techniques of this disclosure.
FIG. 6B illustrates a multicast forwarding table.

Hierarchy generator 52A sends an identifier for sending forwarding unit 40B for the multicast list to setup module 50A, which allocates and issues token 60 to forwarding unit 40B. Setup module 50A may issue token 60 in one or more fabric messages together with an identifier for interface list 43, such as a next hop identifier. In addition, setup module 50A stores token 60 as a lookup or key value for a local forwarding data structure of forwarding structures 54A. Forwarding structures 54A is a set of one or more local forwarding data structures that each includes multicast forwarding state to enable forwarding units 40 to implement a particular distributed hierarchical forwarding structure for a particular multicast group. That is, a local forwarding data structure in forwarding structures 54A includes a subset of forwarding state for a distributed hierarchical forwarding structure for the collection of forwarding units 40. Forwarding structures 54A may include a Forwarding Information Base (FIB) that maps multicast forwarding state through routes, which may be represented as a source/destination address or address prefix pair. An exemplary local forwarding data structure is illustrated in FIG. 6A and described in detail below. In addition to storing token 60 as a lookup value for local forwarding data structure, setup module 50A stores local interfaces, that is, interfaces $64A_1$-$64A_2$ when the new or modified interface list includes any of the local interfaces.

As in forwarding unit 40A, routing unit interface 42B of forwarding unit 40B receives interface list 43 from a routing unit for the router and stores interface list 43 to multicast group interface lists 48B. Setup module 50B of forwarding unit 40B receives token 60 and stores token 60 to a local forwarding data structure in forwarding structures 54B to associate the token with forwarding unit 40A and the corresponding multicast group for interface list 43.

Multicast packet distributors 58A-58B ("distributors 58") replicate and forward multicast packets, received by respective forwarding units 40 via fabric interfaces 33, according to respective forwarding structures 54. When distributor 58 receives a multicast packet for the multicast group for interface list 43, distributor 58 identifies the local forwarding data structure in forwarding structures 54B generated for interface list 43. This local forwarding data structure directs distributor 58B to send fabric communication 62 to forwarding unit 40A via fabric interface 33B for further replication. Fabric communication 62 includes the multicast packet and token 60. Fabric communication 62 may comprise multiple communications to send data units, i.e., portions of the multicast packet together with token 60.

Distributor 58A receives fabric communication 62, determines a local forwarding data structure in forwarding structures 54A using token 60, and replicates and/or forwards the multicast packet of fabric communication 62 according to the determined local forwarding data structure. If interface list 43 includes an OIF that includes one or more of local interfaces 64A, distributor 58A locally elaborates the multicast packet. That is, distributor 58A outputs the multicast packet to the relevant local interfaces 64A. In some instances, forwarding unit 40B is an ingress forwarding unit for the multicast group associated with interface list 43. In such instances, interface list 43 includes an IIF that lists one of interfaces 64B associated with forwarding unit 40B.

Forwarding unit 40B associates a multicast distribution tree identifier with the local forwarding data structure in forwarding structures 54B. Routing unit interface 42B may receive the multicast group identifier, which may comprise a source/multicast group address pair, in a next hop structure that constitutes interface list 43. When one of interfaces 64B receives a multicast packet exhibiting the multicast distribution tree identifier, distributor 58B keys the multicast distribution tree identifier to forwarding structures 54B to identify the corresponding local forwarding data structure, then replicates and/or forwards the packet accordingly.

In some instances, interface list 43 supersedes an existing interface list in multicast group interface lists 48 according to updates by the routing unit to the multicast distribution tree for corresponding multicast group. In accordance with the techniques of this disclosure, routing unit interfaces 42 replace the existing interface list with interface list 43 in respective multicast group interface lists 48. As a result, contrary to conventional techniques, forwarding units 40 do not need to maintain both the stale and the updated interface lists in, for example, separate next hops of multicast group interface lists 48 during transition.

In such instances, a local forwarding data structure may already exist for interface list 43. Setup modules 50 create a new local forwarding data structure in respective forwarding structures 54 for updated interfaces in interface list 43. Forwarding structures 54 maintains the new as well as any previous, or "stale," local forwarding data structures for the corresponding multicast group until directed to remove stale forwarding structure by respective synchronization modules 56A-56B. Forwarding structures 54 may contain a plurality of stale local forwarding data structures for a single multicast group as a result of multiple updates to multicast group interface lists 48.

Synchronization modules 56A-56B of respective forwarding units 40 perform the make-before-break (MBB) techniques of this disclosure to ensure proper ordering of multicast packets in a multicast stream, uniform treatment of particular multicast packets across forwarding units 40, and continued operation by forwarding units 40 of stale distributed hierarchical forwarding structures for multicast packets "in-transit" within forwarding units 40 according to the stale distributed hierarchical forwarding structures.

For example, after setup module 50A creates a new local forwarding data structure for an updated interface list 43 and issues token 60 to forwarding unit 40B, synchronization module 56A sends ready message 63 to any ingress forwarding units 40 specified in interface list 43, which in the illustrated embodiment includes forwarding unit 40B. Ready message 63, received by synchronization module 56B, indicates forwarding unit 40A has generated a new local forwarding data structure in accordance with the described techniques and is ready to receive multicast packets for replication and/or forwarding using the new local forwarding data structure. Ready message 63 may include an identifier for interface list 43 stored to multicast group interface lists 48B, such as a next hop ID or a multicast distribution tree identifier. In some embodiments, setup module 50A may forgo issuing a new token 60 when interface list 43 includes merely changes to output interfaces of already-represented forwarding units 40. This optimization is relevant whenever there is a change only in the list of local interfaces within interface list 43 associated with a particular one of forwarding units 40, but the list of egress ones of forwarding units 40 for multicast traffic associated with the multicast group is unchanged. The ingress one of forwarding units 40 for interface list 43 may remain unaware of the value of tokens exchanged (or not exchanged in this instance). These techniques may improve scalability.

Synchronization module 56B determines a number of egress forwarding units 40 using interface list 43. Receiving a ready message 63 from each of the egress forwarding units indicates to synchronization module 56B that the egress forwarding units 40 have prepared a local forwarding data structure for interface list 43. Synchronization module 56B therefore directs distributor 58B to temporarily cease forwarding and replicating multicast packets for the multicast group corresponding to interface list 43.

Upon directing distributor 58B to cease operations for the particular multicast group, synchronization module 56B issues tear-down message 65 to receiving, or "downstream," forwarding units according to the stale local forwarding data structure in forwarding structures 54B for the prior interface list for the multicast group corresponding to interface 43. Each tear-down message 65 comprises a control packet and the appropriate token that keys to the stale local forwarding data structure for the downstream forwarding unit. The control packet directs the downstream forwarding unit to delete the stale local forwarding data structure. Egress forwarding units, including forwarding unit 40A, replicate and/or forward tear-down message 65 to their respective downstream forwarding units according to their now stale local forwarding data structures. In this way, each egress forwarding unit 40 represented in the stale distributed hierarchical forwarding structure receives tear-down message 65 for the stale local forwarding data structure only after handling any in-transit multicast packets therein to ensure MBB. After replicating and/or forwarding tear-down message 65, if necessary, to downstream forwarding units, each of forwarding units 40 deletes, or marks for garbage-collection, the stale local forwarding data structure. In addition, each of downstream forwarding units 40 issues a tear-down acknowledgement message to ingress forwarding units 40.

In some embodiments, to tear down a stale distributed multicast forwarding structure, each forwarding unit 40, as an aspect of determining hierarchical forwarding relationship for interface list 43, tracks tokens received from each of its receiving, e.g., "child," forwarding units. When a forwarding unit 40 receives a token from all of its expected receiving forwarding units, only then does the forwarding unit 40 issue its own token 43 to its sending forwarding unit. When ingress forwarding units 40B receives tokens from each of its expected receiving forwarding units according to the hierarchical forwarding relationships, a new local forwarding data structure is present in all of the represented forwarding units 40, and synchronization module 56B may issue tear-down message 65. This technique may reduce inter-forwarding unit 40 signaling.

When synchronization module 56B receives tear-down acknowledgement message 65 from each of the downstream forwarding units 40, synchronization module 56B directs distributor 58B to begin using, or "cut over" to, the new local forwarding data structure in forwarding structures 54B to replicate and forward multicast packets for the multicast group corresponding to interface list 43. In this way, synchronization module 56B ensures MBB for the multicast packets for the multicast group.

The distributed setup, replication, and MBB techniques described above allow in-place replacement of multicast group interface lists 48B. As a result, routes may be mapped directly to a next hop rather than requiring, according to conventional techniques, an indirect next hop to allow atomic cut over operations. As a result, forwarding units 40 as well as the routing unit for the router comprising forwarding units 40 may decrease memory utilization from having a single next hop structure and fewer indirect next hops for a multicast group.

In addition, the techniques may enable proper ordering of multicast packet delivery by ensuring multicast packets in-transit according to an old hierarchical forwarding structure are output prior to cutting over to the new hierarchical forwarding structure. For example, an old hierarchical forwarding structure may include a large number of egress forwarding units 40 that result in many levels for the old hierarchical forwarding structure, while a new hierarchical forwarding structure may include many fewer egress forwarding units 40 and a concomitantly fewer number levels for the new hierarchical forwarding structure. Cutting over to the new hierarchical forwarding structure while packets are "in-transit" according to the old hierarchical forwarding structure may cause output of later multicast packets within a multicast stream in accordance with the new hierarchical forwarding structure prior to output of earlier packets of the multicast stream. Synchronization modules 56, as described above, prevent cut-over until the old hierarchical forwarding structure is "flushed." As a result, despite distributed generation and implementation of hierarchical forwarding structures, the techniques may nevertheless prevent out-of-order packet delivery.

FIG. 6A illustrates a local forwarding data structure 70 generated by setup module 50B of forwarding unit 40B of FIG. 5 after receiving token 60 from forwarding unit 40A. Local forwarding data structure 70 is a local aspect of a hierarchical forwarding structure, e.g., a multicast replication tree, distributed within multiple multicast forwarding units 40 to perform replication and forwarding of multicast packets for a multicast group corresponding to the hierarchical forwarding structure. Forwarding unit 40B establishes local forwarding data structure 70 according to the distributed setup techniques described herein. That is, rather than receiving all multicast forwarding state from a centralized agent, such as a routing or other control unit, forwarding unit 40B receives messages from one or more other forwarding units, in this instance forwarding unit 40A and a forwarding unit 40C, that include multicast forwarding state in the form of tokens. This may ensure faster FIB convergence, in addition to eliminating a single point of control failure.

Local forwarding data structure 70 includes key token 72A with value "14" that identifies local forwarding data structure 70 among a set of one or more local forwarding data structures of forwarding unit 40B. That is, forwarding unit 40B provides key token 72A to any parent forwarding units of a distributed hierarchical forwarding structure. Key token 72A may comprise an integer, string, or other data type. When distributor 58 receives a token with value "14," together a multicast packet via fabric interface 33B, forwarding unit 40B keys the value to local forwarding data structure 70 and replicates and forwards the multicast packet according to values therein. In the embodiment illustrated in FIG. 5, forwarding unit 40B is an ingress forwarding unit for the multicast group, setup module 50B therefore inserts to multicast forwarding table 74 of FIG. 6B, described in detail below, a mapping of the token "14" to a multicast distribution tree identifier to identify local forwarding data structure 70 and, by extension, the corresponding distributed forwarding structure to be used by forwarding units 40 to replicate and forward multicast traffic for the multicast group.

Local forwarding data structure 70 additionally includes child replication entries 72B and 72C to describe other forwarding units 40 that occupy a lower level in a hierarchical forwarding structure, i.e., "downstream" forwarding units, together with tokens to specify local forwarding data structures in the respective child forwarding units. For example, during distributed hierarchical forwarding structure setup for a multicast group, forwarding unit 40B receives a token with value "1053" for the multicast group from forwarding unit 40A. Forwarding unit 40B populates child replication entry 72B to associate forwarding unit 40A with the token. When distributor 58B receives a token with value "14," together a multicast packet via fabric interface 33B, forwarding unit 40B keys the value to local forwarding data structure 70, replicates the multicast packet, and forwards a replicated multicast packet and token "1053" to forwarding unit 40A and a replicated packet and token "7" to forwarding unit 40C. The illustrated values "40A" and "40C" in child replication entries 72B and 72C represent indices or other identifiers for respective forwarding units 40A and 40C. Local forwarding data structure 70 may have more or fewer child replication entries. In instances where forwarding unit 40B occupies a lowest level of the hierarchical forwarding structure for the multicast group, local forwarding data structure 70 may not include any child replication entries.

Local forwarding data structure 70 additionally includes local elaboration entries 72D and 72E that specify local interfaces $64B_1$ and $64B_2$. Local forwarding data structure 70 may specify fewer or more local elaboration entries. Setup module 50B may populate local forwarding data structure 70 using an OIF, received from a centralized agent such as a routing or other control unit of a router than includes forwarding units 40, that specifies, for a multicast distribution tree for the multicast group, the output interfaces of the router to which multicast traffic should be outputted. Accordingly, distributor 58B, in addition to replicating and forwarding multicast packets to child forwarding units 40A and 40B, outputs the multicast packets to downstream devices via local interfaces $64B_1$ and $64B_2$.

FIG. 6B illustrates multicast forwarding table 74 of forwarding unit 40B. Multicast forwarding table entries 76A-76C maps multicast distribution tree identifiers to key tokens for local forwarding data structures within forwarding unit 40B. For example, multicast forwarding table entry 76B maps the multicast group identified by source/destination address pair {S7,G5} to local token "14" that is a key token to local forwarding data structure 70 of FIG. 6A. The source/destination address pair represents a source network address ("S7") and group network address ("G5") for the multicast group, respectively, and identifies inbound multicast packets to distributor 58B. Distributor 58B maps inbound multicast packets having the {S7,G5} source/destination pair to token "14" using multicast forwarding table entry 76B, keys token "14" to local forwarding data structure 70, and replicates and forwards the multicast packets according to the forwarding state within local forwarding data structure 70. Forwarding unit 40B may store multicast forwarding table 74 in forwarding structures 54B.

Figure 7A:
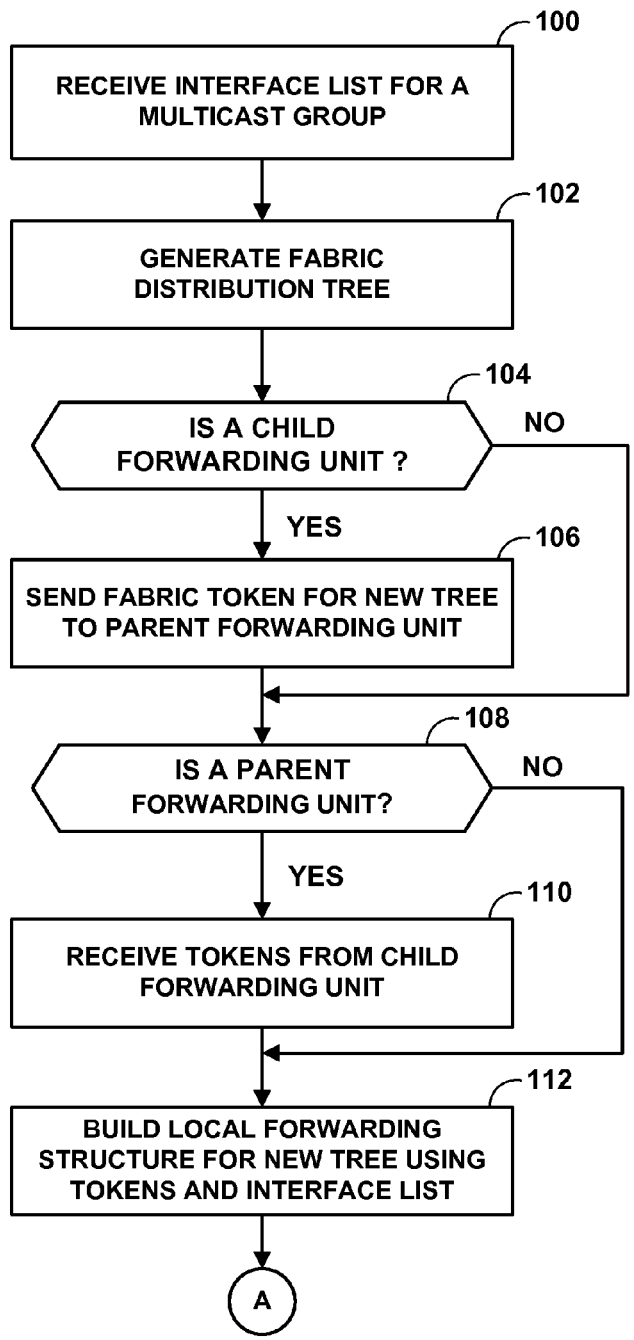
FIGS. 7A-7B illustrate a flowchart representing an exemplary mode of operation of an exemplary embodiment of one of exemplary forwarding units of FIG. 5 to set up a new local forwarding data structure for a multicast group on a router in accordance with distributed, make-before-break setup techniques described herein.
Figure 7B:
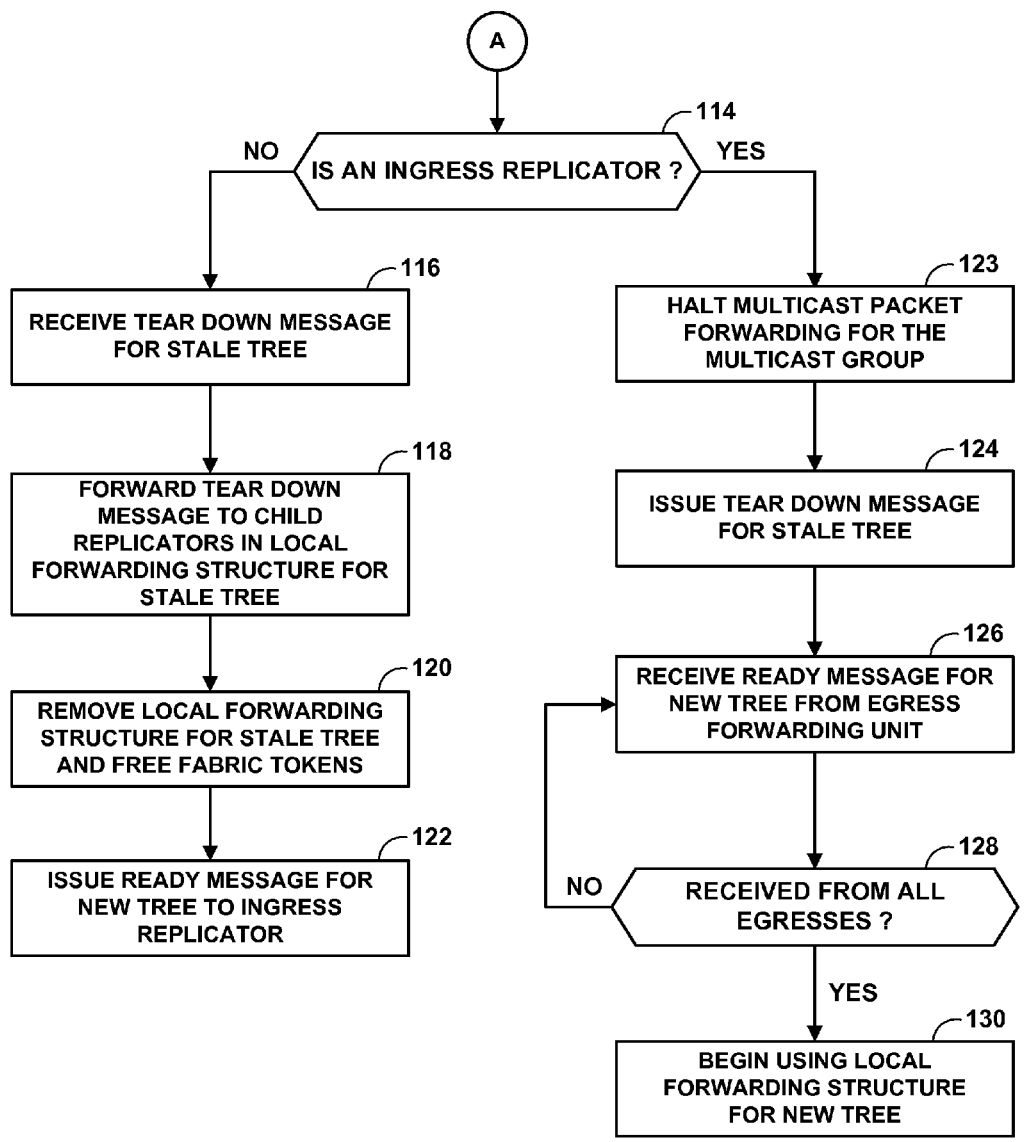

FIGS. 7A-7B illustrate a flowchart representing an exemplary mode of operation of an exemplary embodiment of one of forwarding units 40 of FIG. 5 to set up a new local forwarding data structure for a multicast group on a router in accordance with distributed, MBB setup techniques described herein. The techniques are described with respect to forwarding unit 40A.

Routing unit 42A of forwarding unit 40A receives interface list 43 for a multicast group and stores interface list 43 to multicast group interfaces lists 48A (100). Hierarchy generator 52A creates a hierarchical forwarding structure, in this instance a new multicast replication tree, by inputting output interfaces of interface 43 to a deterministic hierarchical forwarding structure generation algorithm (102). Hierarchy generator 52A uses the new multicast replication tree to identify a sending, parent forwarding unit 40, if any, for forwarding unit 40A (104). If forwarding unit 40A is a receiving, child forwarding unit (YES branch of 104), setup module 50A issues to the parent forwarding unit 40 a fabric token for a local forwarding data structure corresponding to the new multicast replication tree (106). Hierarchy generator 52A additionally uses the new multicast replication tree to identify any one or more receiving, child forwarding units 40 of forwarding unit 40A for the multicast group (108). If forwarding unit 40A is a parent, sending forwarding unit (YES branch of 108), setup module 50A receives tokens from the receiving, child forwarding units (100). Setup module 50A uses received tokens and identifiers for the receiving, child forwarding units, as well as local interfaces 64A listed as output interfaces in interface list 43, to build a local forwarding data structure in forwarding structures 54A for the multicast groups (112).

In the illustrated, exemplary operation, setup module 50A determines from interface list 43 whether forwarding unit 40A is an ingress forwarding unit for the multicast group (114). If so (YES branch of 114), forwarding unit 40A first temporarily halts replication and forwarding operations for multicast packets for the multicast group (123). Forwarding unit 40A then issues a tear-down message using a stale local forwarding data structure that embodies an aspect of a stale multicast replication tree for the multicast group on the router (124). That is, forwarding unit 40A replicates and forwards the tear-down message to child replicators according to the stale local forwarding data structure. Synchronization module 56A receives ready messages from egress ones of forwarding units 40 indicating the egress forwarding units 40 are ready to use the new distributed multicast replication tree (126). When synchronization module 56A has ready message from all egress forwarding units 40 (YES branch of 128), synchronization module 56A directs distributor 58A to cut over to begin replication and forwarding using the new local forwarding data structure that contains local forwarding state for the new multicast replication tree for the multicast group (130). Synchronization module 56A may identify egress forwarding units 40 using an OIF of interface list 43.

If forwarding unit 40A is not an ingress forwarding unit (NO branch of 114), then synchronization module 56A receives a tear-down message directing setup module 50A to delete the local forwarding data structure that contains stale local forwarding state for the stale multicast replication tree for the multicast group (116). Synchronization module 56A first directs distributor 58A to replicate and forward the tear-down message to any receiving, child forwarding units 40 in the stale local forwarding data structure for the stale, distributed multicast replication tree (118). Setup module 50A then deletes the stale local forwarding data structure (120) and synchronization module 56A issues a ready message to the ingress forwarding unit 40 to indicate forwarding unit 40A is prepared to replicate and forward multicast traffic according to the new local forwarding data structure for the multicast group (122).

Figure 8:
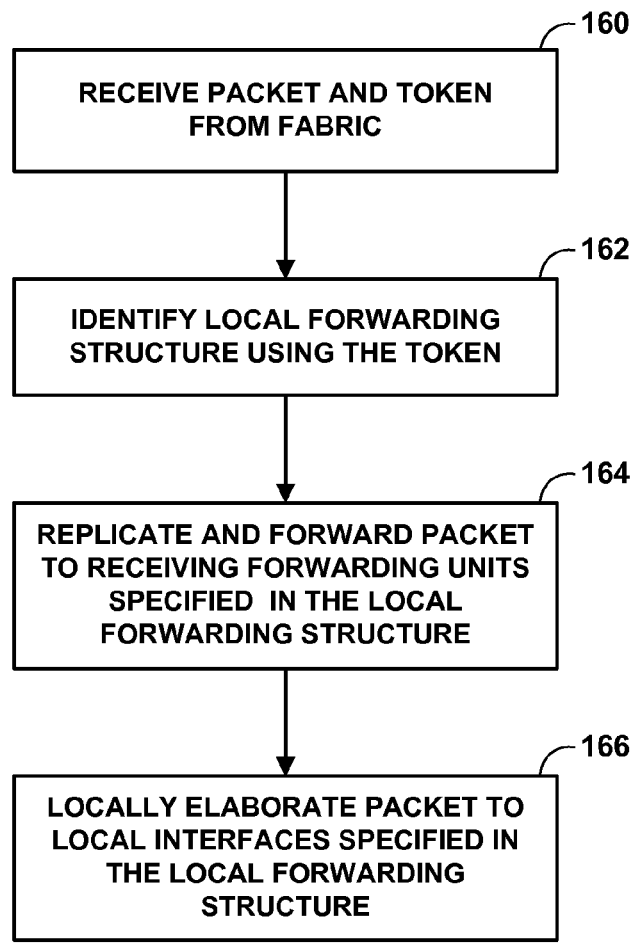
FIG. 8 illustrates a flowchart representing an exemplary mode of operation of an exemplary embodiment of one of exemplary forwarding units of FIG. 5 to replicate and forwarding multicast packets using local forwarding data structures generated in accordance with the techniques of this disclosure.

FIG. 8 illustrates a flowchart representing an exemplary mode of operation of an exemplary embodiment of one of forwarding units 40 of FIG. 5 to replicate and forwarding multicast packets using local forwarding data structures generated in accordance with the techniques of this disclosure. The techniques are described with respect to forwarding unit 40A.

Distributor 58A receives a multicast packet and an associated fabric token via fabric interface 33A (160). Distributor 58A keys the token to forwarding structures 54A to identify a local forwarding data structure keyed (162). Distributor 58A then replicates and forwards the multicast packet to receiving, child forwarding units 40 specified in the local forwarding data structure (164). Distributor 58A additionally outputs the multicast packet to any local interface 64 specified in the local forwarding data structure (166).

Figure 9A:
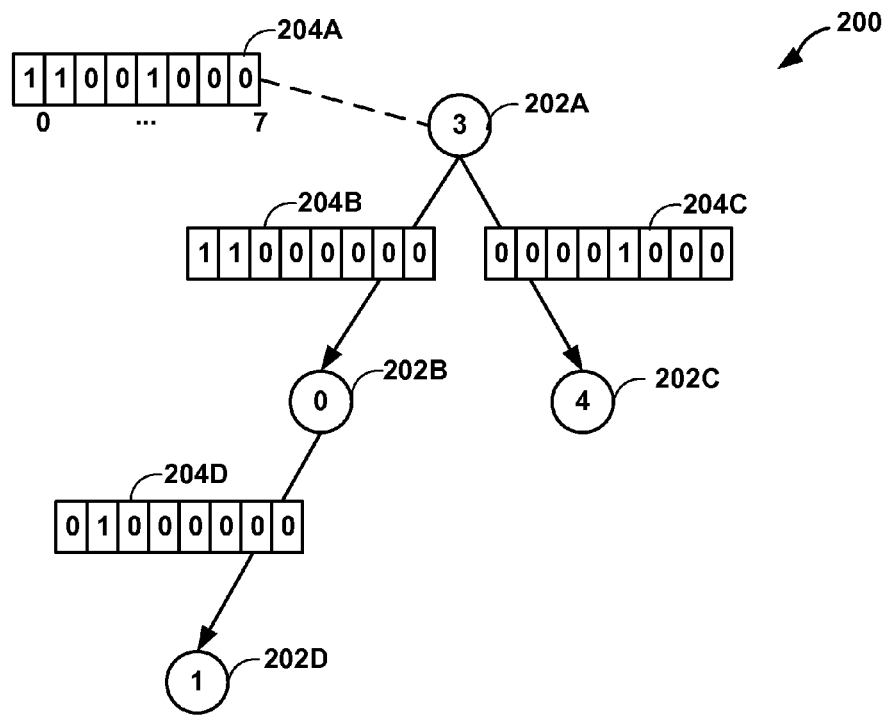
FIG. 9A is a block diagram that illustrates operation of exemplary embodiments of packet replicators of FIG. 2 to replicate and forward a multicast packet in accordance with an implicit hierarchical forwarding structure.

FIG. 9A is a block diagram that illustrates operation of exemplary embodiments of packet replicators 23 of router 12 of FIG. 2 to replicate and forward a multicast packet in accordance with an implicit hierarchical forwarding structure 200. Later generations of packet replicators 23 may eschew replication and forwarding of multicast packets according to an explicit hierarchical forwarding structure that involves maintenance of extensive forwarding state, in favor of conveying forwarding state downstream to additional "downstream" replicators. In accordance with the described techniques, packet replicators 23 cooperatively exchange tokens to further multicast packet replication and distribution using implicit forwarding structures.

Implicit forwarding structure 200 includes nodes 202A, 202B, 202C, and 202D representing exemplary embodiments of packet replicators 23D, 23A, 23E, and 23B, respectively. Packet replicators 23 receive an interface list, which may comprise a multicast next hop structure, for a multicast group. Ingress packet replicator 23D represented by node 202A uses an OIF of the received interface list to generate bit vector 204A. In the illustrated example, bit vectors 204A-204D are 8-bit arrays with binary elements indexed 0 through 7, with each index representing one of packet replicators 23A-23H. For example, element 2 represents packet replicators 23C. Each element of bit vector 204A that includes a set bit (i.e., a one bit) indicates that the represented one of packet replicators 23 is an egress packet replicator. In the illustrated example, packet replicators 23A, 23B, and 23E are egress packet replicators. Various embodiments of router 12 may include more or fewer packets replicators 23 and, consequently, a larger or smaller bit-vector 204A.

Ingress packet replicator 23D identifies itself as an ingress packet replicator using the received interface list. For example, ingress packet replicator 23D may determine that one of its associated interface 30 is a PIM RPF-check interface and thus an acceptable inbound interface for multicast packets for the multicast group. Ingress packet replicator 23D generates bit vector 204A by setting bits of indexed elements of the vector when the indices represent egress ones of packet replicators 23 according to the received interface list.

In the illustrated example, packet replicators 23 perform packet replication according to a deterministic replication algorithm. Specifically, ingress packet replicator 23D sends a multicast packet together with a bit vector to the packet replicators 23 represented by the left-most and right-most set bits in bit vector 204A. In this instance, the left-most set bit in bit vector 204A is in element 0. Packet replicator 23D masks to zero the right half of bit vector 204A to generate bit vector 204B and issues a replicated multicast packet to packet replicator 23A (represented by element 0) along with bit vector 204B. Similarly, the right-most set bit in bit vector 204A is in element 4. Packet replicator 23D masks to zero the left half of bit vector 204A to generate bit vector 204C and issues a replicated multicast packet to packet replicator 23E (represented by element 4) along with bit vector 204C.

Packet replicator 23A receives the multicast packet together with bit vector 204B. Packet replicator 23A performs local elaboration to output the multicast packet to associated interfaces 30 of packet replicator 23A. Similarly, packet replicator 23B receives the multicast packet together with bit vector 204C. Packet replicator 23B performs local elaboration to output the multicast packet to associated interfaces 30 of packet replicator 23B.

In addition, packet replicator 23A masks to zero the right half of the non-masked portion of bit vector 204B (i.e., masks bits 2-3 of bits 0-3) and clears element 0 (representing itself) to generate bit vector 204D. Packet replicator 23A replicates and issues the multicast packet to packet replicator 23B represented by element 1 containing the left-most bit of bit vector 204D.

After receiving bit vector 204C, packet replicator 23E performs local elaboration, clears element 4 (representing itself) and determines the bit vector is empty of set bits. Packet replicator 23E therefore performs no additional replication. After receiving bit vector 204D, packet replicator 23B performs local elaboration, clears element 1 (representing itself) and determines the bit vector is empty of set bits. Packet replicator 23B therefore performs no additional replication. In various embodiments, packet replicators 23 may perform replication according to implicit hierarchical forwarding structures generated using different deterministic replication algorithms.

Because packet replicators 23 perform packet replication according to a deterministic algorithm, each of packet replicators 23 may input the received interface list to another deterministic algorithm to identify hierarchical forwarding relationships among packet replicators 23. In one embodiment, each of packet replicators 23 may identify its sending packet replicator 23 for the received interface list according to the following algorithm:

// Each replicator stores its index, my_index, that disambiguates
    // the replicator with regard to the other replicators.
    sender_id=ingress packet replicator;
    mask=pattern;
repeat:
    n=count of bits set in 'mask';
    mask_left=pattern formed by setting n/2 leftmost set bits in mask and clearing all other bits;
    mask_right=pattern formed by setting n/2 (+1, if 'n' is odd) rightmost set bits in 'mask', and clearing all other bits;
    if ('my_index' for this packet replicator is set in 'mask_left') {
    receiver=leftmost bit set in mask_left;
    mask=mask_left;
    } else {
    receiver=rightmost bit set in mask_right;
    mask=mask_right;
    }
    if (receiver is equal to 'my_index') {
    goto done;
    } else {
    sender_id=receiver;
    goto repeat;
    }
done:
    // The sender packet replicator index for my_index is sender_id.

Figure 9B:
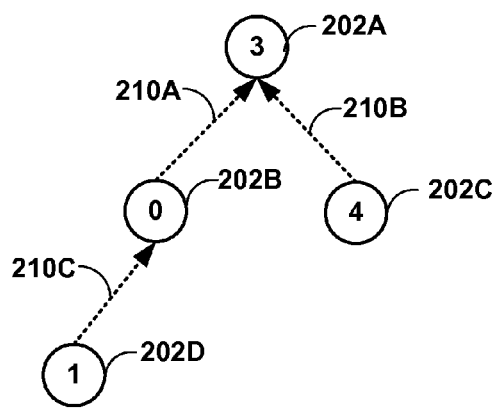
FIG. 9B illustrates the implicit hierarchical forwarding structure of FIG. 9A and the passage of tokens among the packet replicators of FIG. 2 to perform the distributed hierarchical forwarding structure setup techniques of this disclosure

FIG. 9B illustrates the implicit hierarchical forwarding structure 200 of FIG. 9A and passage of tokens 210A-210C among represented packet replicators 23 to perform the distributed hierarchical forwarding structure setup techniques of this disclosure. After receiving a new interface list, to maintain MBB operations, packet replicators 23 disambiguate new and stale interface lists. Packet replicators 23 issue tokens according to hierarchical forwarding relationships and use the tokens for disambiguation of new and stale interface lists to identity the appropriate local interfaces 30 for the new interface lists and yet maintain MBB operations with regard to the stale interface lists and stale local forwarding data structure. In the illustrated example, packet replicators 23A, 23E, and 23B issue respective tokens 210A, 210B, and 210C to their respective sending packet replicators, which store the tokens in a local forwarding data structure for the multicast group corresponding to the new interface list. In addition, each of packet replicators 23 may perform the techniques described with respect to FIG. 7 to facilitate MBB operations.

Each of sending packet replicators 23 replicates and forwards multicast packets to each of its respective receiving packet replicators 23 together with the appropriate bit vector and the individual token received from each of receiving packet replicators 23. In this manner, packet replicators 23 perform the distributed hierarchical forwarding structure setup techniques of this disclosure.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a non-transitory computer-readable medium or computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals or carrier waves, although the term "computer-readable media" may include transient media such as signals, in addition to physical storage media.

Various embodiments of the invention have been described. These and other embodiments are within the scope of the following claims.

The invention claimed is:

1. A method comprising:
    determining, with a first packet replicator of a plurality of packet replicators of a network device, a hierarchical forwarding relationship for the first packet replicator within a distributed hierarchical forwarding structure for internally forwarding multicast packets for a multicast stream through the plurality of packet replicators from an input interface of the network device to one or more output interfaces of the network device, wherein the hierarchical forwarding relationship for the first packet replicator specifies a parent packet replicator of the plurality of packet replicators from which the first packet replicator is to receive data units of multicast packets in the multicast packet stream according to the distributed hierarchical forwarding structure;
    associating a first token with a local forwarding data structure of the first packet replicator, the local forwarding data structure comprising multicast forwarding state for the distributed hierarchical forwarding structure;
    issuing a message within the network device from the first packet replicator to the parent packet replicator, wherein the message includes the first token and directs the parent packet replicator to internally forward packets in accordance with the hierarchical forwarding relationship; and
    receiving, with the first packet replicator, a data unit of a multicast packet of the multicast packet stream and the first token from the parent packet replicator and, upon identifying the local forwarding data structure using the first token, forwarding the data unit in accordance with the local forwarding data structure.

2. The method of claim 1, wherein the first token comprises one of a string, integer, and bit string.

3. The method of claim 1, further comprising:
    associating in the local forwarding data structure, with the first packet replicator, the first token with one or more child replicators to which the first packet replicator is to forward data units of multicast packets in the multicast packet stream; and
    outputting the data unit to each of the child replicators associated with the first token in the local forwarding data structure.

4. The method of claim 3, further comprising:
    receiving, with the first packet replicator, a second token from a first one of child replicators; and
    associating, with the first packet replicator, the second token with the first one of the child replicators in the local forwarding data structure,
    wherein outputting the data unit to the child replicators comprises outputting the data unit with the second token to the first one of the child replicators.

5. The method of claim 1, further comprising:
    receiving an interface list from a network device control unit with the first packet replicator, wherein the interface list specifies one or more output interfaces of the network device for a multicast distribution tree for the multicast packet stream,
    wherein determining the hierarchical forwarding relationship for the first packet replicator comprises inputting the interface list to a deterministic algorithm to identify the parent packet replicator from which the first packet replicator is to receive the multicast packet stream.

6. The method of claim 5, wherein the interface list comprises a multicast next hop structure.

7. The method of claim 5, wherein inputting the interface list to a deterministic algorithm to identify the parent packet replicator from which the first packet replicator is to receive the multicast packet stream comprises:
    generating, with the first packet replicator, a hierarchical forwarding structure using the deterministic algorithm; and
    identifying the parent packet replicator for the first packet replicator using the hierarchical forwarding structure.

8. The method of claim 1, wherein each of the plurality of packet replicators of a network device is associated with one or more interfaces of the network device, and further comprising:
    associating a first interface of the one or more interfaces associated to the first packet replicator with the first token in the local forwarding data structure; and
    after identifying the local forwarding data structure using the first token, determining the first interface associated with the first token in the local forwarding data structure and outputting the packet from the network device via the first interface.

9. The method of claim 1, further comprising:
    determining, with a second one of the plurality of packet replicators of the network device, a hierarchical forwarding relationship for the second packet replicator within the distributed hierarchical forwarding structure, wherein the hierarchical forwarding relationship for the second packet replicator specifies the first packet replicator as a parent packet replicator for the second packet replicator from which the second packet replicator is to receive the multicast packet stream;
    issuing a second token from the second packet replicator to the first packet replicator;
    receiving, with the first packet replicator, the second token from the second packet replicator; and
    associating, with the first packet replicator, the second token with the second packet replicator in the local forwarding data structure; and outputting the data unit with the second token from the first packet replicator to the second packet replicator.

10. The method of claim 1,
determining, with a second one of the plurality of packet replicators, the second packet replicator is an ingress one of the packet replicators of the network device for the multicast packet stream;
storing, with the second packet replicator, a second local forwarding data structure that includes forwarding state for a new distributed hierarchical forwarding structure for the multicast packet stream,
storing, with the second packet replicator, a stale local forwarding data structure that includes forwarding state for a stale distributed hierarchical forwarding structure for the multicast packet stream; and
issuing a tear-down message to one or more child replicators identified in the stale local forwarding data structure.

11. The method of claim 10, further comprising:
receiving an inbound packet for the multicast packet stream at an interface of the network device associated with the second packet replicator;
determining, with the second packet replicator, each of the egress ones of the packet replicators of the network device for the stale distributed hierarchical forwarding structure for the multicast packet stream;
receiving ready messages for the new distributed hierarchical forwarding structure for the multicast packet stream from each of the egress packet replicators; and
only after receiving the ready messages from each of the egress packet replicators, outputting replicated copies of a data unit of the inbound packet to the child replicators identified in the second local forwarding data structure.

12. The method of claim 11, further comprising:
identifying, with the second packet replicator, the second local forwarding data structure using a multicast distribution tree identifier contained in the inbound packet; and
determining the child replicators from the second local forwarding data structure.

13. The method of claim 1,
wherein the first packet replicator stores a stale local forwarding data structure that includes forwarding state for a stale distributed hierarchical forwarding structure for the multicast packet stream, and further comprising:
determining, with the first packet replicator, the first packet replicator is an egress packet replicator of the network device for the multicast packet stream;
receiving, with the first packet replicator, a tear-down message for the stale distributed hierarchical forwarding structure from another one of the packet replicators; and
upon receiving the tear-down message, removing the stale local forwarding data structure.

14. The method of claim 13,
only after associating the first token with the local forwarding data structure and issuing the first token from the first packet replicator to the parent packet replicator, issuing a ready message from the first packet replicator to an ingress one of the packet replicators of the network device for the multicast packet stream.

15. A router comprising:
a routing unit executed by a control unit;
a plurality of network interfaces;
a plurality of packet replicators each associated with a different one or more of the plurality of network interfaces, wherein a first packet replicator of the plurality of packet replicators comprises:

a hierarchy generator that determines, a hierarchical forwarding relationship for the first packet replicator within a distributed hierarchical forwarding structure for internally forwarding multicast packets for a multicast stream through the plurality of packet replicators from an input interface of the network device to one or more output interfaces of the network device, wherein the hierarchical forwarding relationship for the first packet replicator specifies a parent packet replicator of the plurality of packet replicators from which the first packet replicator is to receive data units of multicast packets in the multicast packet stream according to the distributed hierarchical forwarding structure;
a setup module that associates a first token with a local forwarding data structure of the first packet replicator, the local forwarding data structure comprising multicast forwarding state for the distributed hierarchical forwarding structure,
wherein the setup module issues a message within the network device from the first packet replicator to the parent packet replicator, wherein the message directs the parent packet replicator to internally forward packets in accordance with the hierarchical forwarding relationship; and
a distributor that, upon the setup module receiving a data unit of a multicast packet of the multicast packet stream and the first token from the parent packet replicator, identifies the local forwarding data structure using the first token and forwards the data unit in accordance with the local forwarding data structure.

16. The router of claim 15, wherein the first token comprises one of a string, integer, and bit string.

17. The router of claim 15,
wherein the setup module associates, in the local forwarding data structure, the first token with one or more child replicators to which the first packet replicator is to forward data units of multicast packets in the multicast packet stream, and
wherein the distributor outputs the replicated copy of the data unit to each of the child replicators associated with the first token in the local forwarding data structure.

18. The router of claim 17,
wherein the fabric interface receives a second token from a first one of the child replicators,
wherein the setup module associates the second token with the first one of the child replicators in the local forwarding data structure, and
wherein the distributor outputs the data unit with the second token to the first one of the child replicators.

19. The router of claim 15, further comprising:
a routing unit interface that receives an interface list from the routing unit, wherein the interface list specifies one or more of the network interfaces for a multicast distribution tree for the multicast packet stream,
wherein the hierarchy generator inputs the interface list to a deterministic algorithm to identify the parent packet replicator from which the first packet replicator is to receive the multicast packet stream.

20. The router of claim 19, wherein the interface list comprises a multicast next hop structure.

21. The router of claim 19,
wherein the hierarchy generator generates a hierarchical forwarding structure using the deterministic algorithm, and
wherein the hierarchy generator identifies the parent packet replicator for the packet replicator using the hierarchical forwarding structure.

22. The router of claim 15,
wherein the setup module associates a first interface of the one or more interfaces associated with packet replicator with the first token in the local forwarding data structure, and
wherein, after identifying the local forwarding data structure using the first token, the distributor determines the first interface associated with the first token in the local forwarding data structure and outputs the packet from the router via the first interface.

23. The router of claim 15,
wherein a second one of the plurality of packet replicators comprises:
a hierarchy generator that determines, a hierarchical forwarding relationship for the second packet replicator within the distributed hierarchical forwarding structure, wherein the hierarchical forwarding relationship for the second packet replicator specifies a parent one of the packet replicators from which the second packet replicator is to receive the multicast packet stream;
a fabric interface; and
a setup module that issues a second token to the first packet replicator via the fabric interface of the second packet replicator,
wherein the setup module of the first packet replicator receives the second token via the fabric interface of the first packet replicator,
wherein the setup module of the first packet replicator associates the second token with the second packet replicator in the local forwarding data structure, and
wherein the distributor of the first packet replicator outputs the data unit with the second token to the second packet replicator.

24. The router of claim 15,
wherein a second one of the plurality of packet replicators comprises:
a setup module that determines the second packet replicator is an ingress one of the packet replicators of the network device for the multicast packet stream;
a second local forwarding data structure that includes forwarding state for a new distributed hierarchical forwarding structure for the multicast packet stream;
a stale local forwarding data structure that includes forwarding state for a stale distributed hierarchical forwarding structure for the multicast packet stream; and
a synchronization module that issues a tear-down message to one or more child replicators identified in the stale local forwarding data structure.

25. The router of claim 24,
wherein one of the plurality of network interfaces associated with the second packet replicator receives an inbound packet for the multicast packet stream,
wherein the setup module of the second packet replicator determines each of the egress ones of the packet replicators of the network device for the stale distributed hierarchical forwarding structure for the multicast packet stream,
wherein the synchronization module of the second packet replicator receives ready messages for the new distributed hierarchical forwarding structure for the multicast packet stream from each of the egress packet replicators, and
wherein, only after receiving the ready messages from each of the egress packet replicators, the distributor of the second packet replicator outputs replicated copies of a data unit of the inbound packet to the child replicators identified in the second local forwarding data structure.

26. The router of claim 25,
wherein the distributor of the second packet replicator identifies the second local forwarding data structure using a multicast distribution tree identifier contained in the inbound packet, and
wherein the distributor of the second packet replicator determines the child replicators from the second local forwarding data structure.

27. The router of claim 15,
wherein the first packet replicator further comprises a stale local forwarding data structure that includes forwarding state for a stale distributed hierarchical forwarding structure for the multicast packet stream,
wherein the first packet replicator further comprises:
a synchronization module that receives a tear-down message for the stale distributed hierarchical forwarding structure from another one of the packet replicators and, upon receiving the tear-down message, removes the stale local forwarding data structure.

28. The router of claim 27,
wherein the synchronization module, only after the setup module associates the first token with the local forwarding data structure and issues the first token from the first packet replicator to the parent packet replicator, issues a ready message from the first packet replicator to an ingress one of the packet replicators of the network device for the multicast packet stream.

29. A non-transitory computer-readable medium comprising instructions for causing a programmable processor to:
determine, with a first packet replicator of a plurality of packet replicators of a network device, a hierarchical forwarding relationship for the first packet replicator within a distributed hierarchical forwarding structure for internally forwarding multicast packets for a multicast stream through the plurality of packet replicators from an input interface of the network device to one or more output interfaces of the network device, wherein the hierarchical forwarding relationship for the first packet replicator specifies a parent packet replicator of the plurality of packet replicators from which the first packet replicator is to receive data units of multicast packets in the multicast packet stream according to the distributed hierarchical forwarding structure;
associate a first token with a local forwarding data structure of the first packet replicator, the local forwarding data structure comprising multicast forwarding state for the distributed hierarchical forwarding structure;
issue a message within the network device from the first packet replicator to the parent packet replicator, wherein the message includes the first token and directs the parent packet replicator to internally forward packets in accordance with the hierarchical forwarding relationship; and
receive, with the first packet replicator, a data unit of a multicast packet of the multicast packet stream and the first token from the parent packet replicator and, upon identifying the local forwarding data structure using the first token, forward the data unit in accordance with the local forwarding data structure.

30. The non-transitory computer-readable medium of claim 29, wherein the first token comprises one of a string, integer, and bit string.

* * * * *